(12) United States Patent  
Parker et al.

(10) Patent No.: US 8,173,057 B2
(45) Date of Patent: May 8, 2012

(54) WASTE CONTAINER AND RELATED METHOD OF MANUFACTURE

(75) Inventors: Brian G. Parker, Alto, MI (US); Paul J. Rugg, Grandville, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 284 days.

(21) Appl. No.: 12/434,115

(22) Filed: May 1, 2009

(65) Prior Publication Data

US 2010/0276839 A1 Nov. 4, 2010

(51) Int. Cl.
*B29C 45/14* (2006.01)

(52) U.S. Cl. ........................................ 264/318; 264/299

(58) Field of Classification Search .................. 264/318, 264/299; 425/DIG. 58, 438, 443, 556; 249/58
See application file for complete search history.

(56) References Cited

U.S. PATENT DOCUMENTS

| | | | | |
|---|---|---|---|---|
| 2,555,578 A | * | 6/1951 | Davis | 351/52 |
| 4,281,770 A | * | 8/1981 | Rainville | 215/396 |
| 4,648,834 A | * | 3/1987 | Von Holdt | 425/556 |
| 5,232,718 A | * | 8/1993 | Miyazawa et al. | 425/577 |
| 5,536,161 A | * | 7/1996 | Smith | 425/438 |
| 2006/0273180 A1 | * | 12/2006 | Ammond et al. | 235/492 |
| 2007/0030151 A1 | * | 2/2007 | Morrow | 340/572.1 |
| 2008/0094224 A1 | * | 4/2008 | Parker et al. | 340/572.8 |

* cited by examiner

*Primary Examiner* — Joseph Del Sole
*Assistant Examiner* — Kimberly A Stewart
(74) *Attorney, Agent, or Firm* — Warner Norcross & Judd LLP

(57) ABSTRACT

A method of forming a container includes providing a mold including at least one bulbous protrusion. The mold is closed to form a mold cavity corresponding to the shape of the container, with the bulbous protrusion being positioned in the mold cavity. Material is injected into the mold cavity to form the container, and the material envelopes the bulbous protrusion to create an undercut slot. The container is removed from the mold and the bulbous protrusion is withdrawn from the slot.

17 Claims, 7 Drawing Sheets

WASTE CONTAINER AND RELATED METHOD OF MANUFACTURE

BACKGROUND OF THE INVENTION

The present invention relates to containers, and more particularly to waste containers including RFID tags or other types of tags.

Waste containers, including wheeled waste carts, are well known and are commonly used in residential areas. The bags of waste that a resident accumulates throughout a given week are typically stored in the waste cart or bin, which is then wheeled outside for pick-up by a waste truck. Residents can pay a flat fee for the waste pick-up service or they can pay based on the weight of waste that is collected.

A system that allows residents to pay based on weight requires a tracking system that determines and records the weight of the waste in each individual waste cart. For example, in one system, radio frequency identification (RFID) tags are attached to or embedded into the waste carts. The trucks include data sensors adapted to read the RFID tags to identify each cart and lifters that are outfitted with scales for weighing the carts. The cart identification and weight data are then recorded through the use of computers on the truck. The recorded data can be used to charge residents based on the weight of the waste in the cart and also to reward residents that participate in recycling programs.

Several methods have been used for attaching the RFID tags to the carts. One such method is in-molding the RFID tag directly into the cart material. However, in-molding is difficult and can result in damage to the RFID tag because of the high temperatures and pressures required for molding. Another method for attaching the RFID tag is placing the RFID tag in a hard, protective case having one or two holes molded therein, and attaching the case to the cart using fasteners. While this method provides a durable connection of the RFID tag to the cart, this method requires the additional step of drilling holes in the cart to accommodate the fasteners and also requires additional parts, which can be misplaced during shipping of the cart. Another method that has been used is attaching the RFID tags to the carts with adhesive labels. While this method is quick and relatively inexpensive, the adhesive attachment is not as durable as desired.

SUMMARY OF THE INVENTION

A method of forming a container is provided that creates a bulbous opening or slot in the container without the use of a movable mold insert. An RFID case can optionally be retained in the slot.

According to the current embodiment, a method of forming a container includes providing a mold including at least one bulbous protrusion. The mold is closed to form a mold cavity corresponding to the shape of the container, with the bulbous protrusion being positioned in the mold cavity. Material is injected into the mold cavity to form the container, and the material envelopes the bulbous protrusion to create an undercut slot. The container is removed from the mold and the bulbous protrusion is withdrawn from the slot.

In some embodiments, a case adapted to hold an RFID tag can be snapped into the slot.

These and other objects, advantages, and features of the invention will be more fully understood and appreciated by reference to the description of the current embodiment and the drawings.

DESCRIPTION OF THE CURRENT EMBODIMENT

Figure 1:
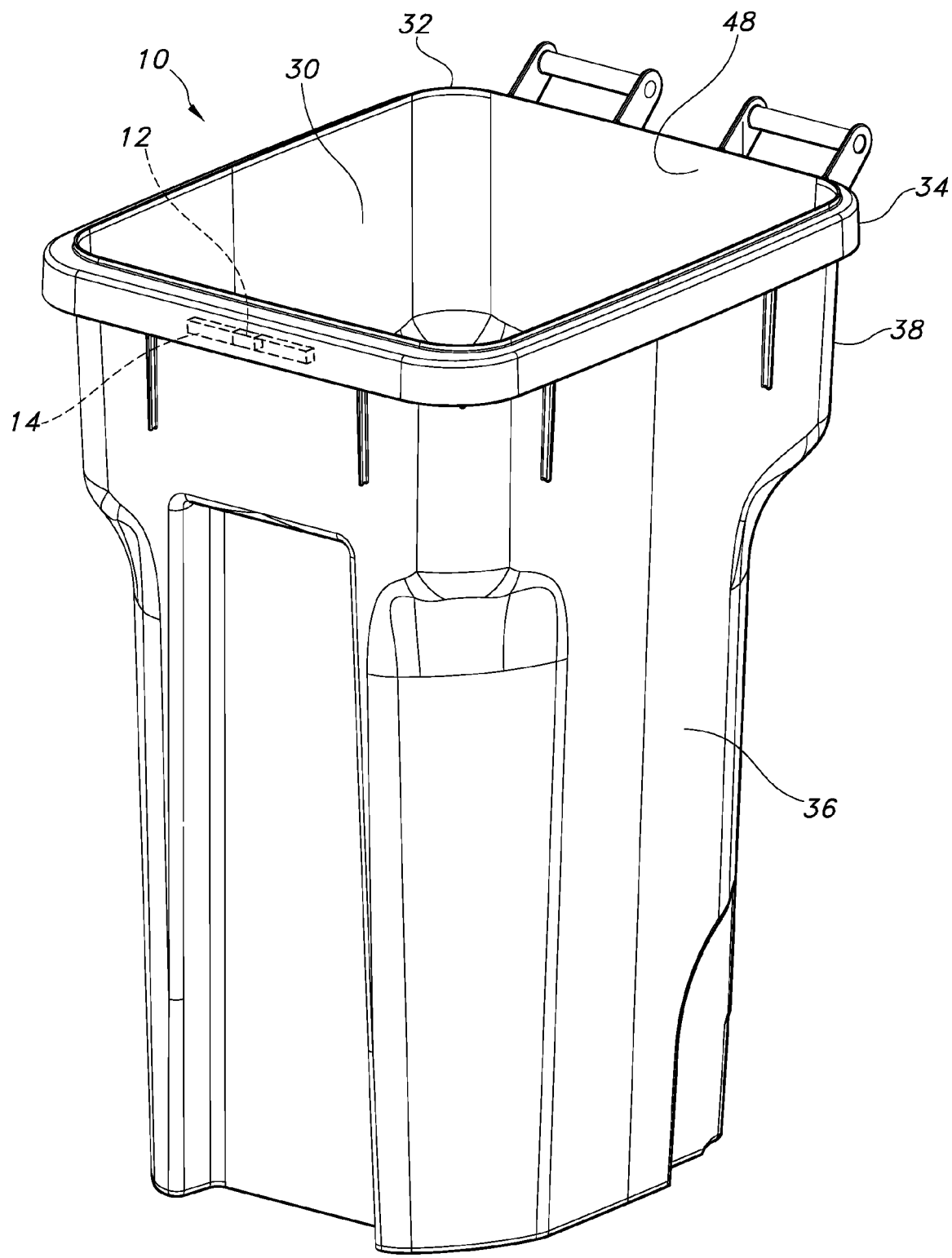
FIG. 1 is a perspective view of a waste cart having an RFID tag in accordance with the present invention.

A waste container or cart is shown in FIG. 1 and is generally designated 10. The waste cart 10 includes an RFID tag 12, protectively enclosed within a case 14 that is snapped into at least one opening or slot 28 in a rib 16 on the cart 10 (see FIG. 2). The cart 10 and rib 16 are formed in a mold 18 having an upper mold half 20 and a lower mold half 22, one of which includes at least one bulbous protrusion 24. The mold halves 20 and 22 are closed to form a mold cavity 26 that corresponds to the shape of the cart 10, with the bulbous protrusion 24 being positioned at least partially inside the mold cavity. Material is injected into the mold cavity 26 to form the cart 10. The material envelopes and surrounds the bulbous protrusion 24. The cart 10 can then be removed from the mold, which separates the bulbous protrusion 24 from the cart 10, leaving a bulbous opening or slot 28 in the cart 10. An object, such as an RFID case or the like, can be snapped into the slot 28.

I. Container/Cart

The cart 10 can be formed in any suitable size and shape. In the illustrated embodiment, the cart 10 is described in connection with a refuse or recycling container adapted to receive and store waste, yard waste, recyclable materials and/or other waste products. However, the cart 10 described in connection with the present invention can be adapted for the receipt and storage of any other type of goods or products, including products to be stored in a container having an RFID tag. In the illustrated embodiment, the cart 10 has a generally square-shaped cross section and has rounded edges. The cart forms a hollow chamber 30 and includes an open upper end 32, through which the waste products can be placed into the cart 10 (FIG. 1). The cart 10 can be formed from any suitable material, including plastics and other moldable materials.

Figure 2:
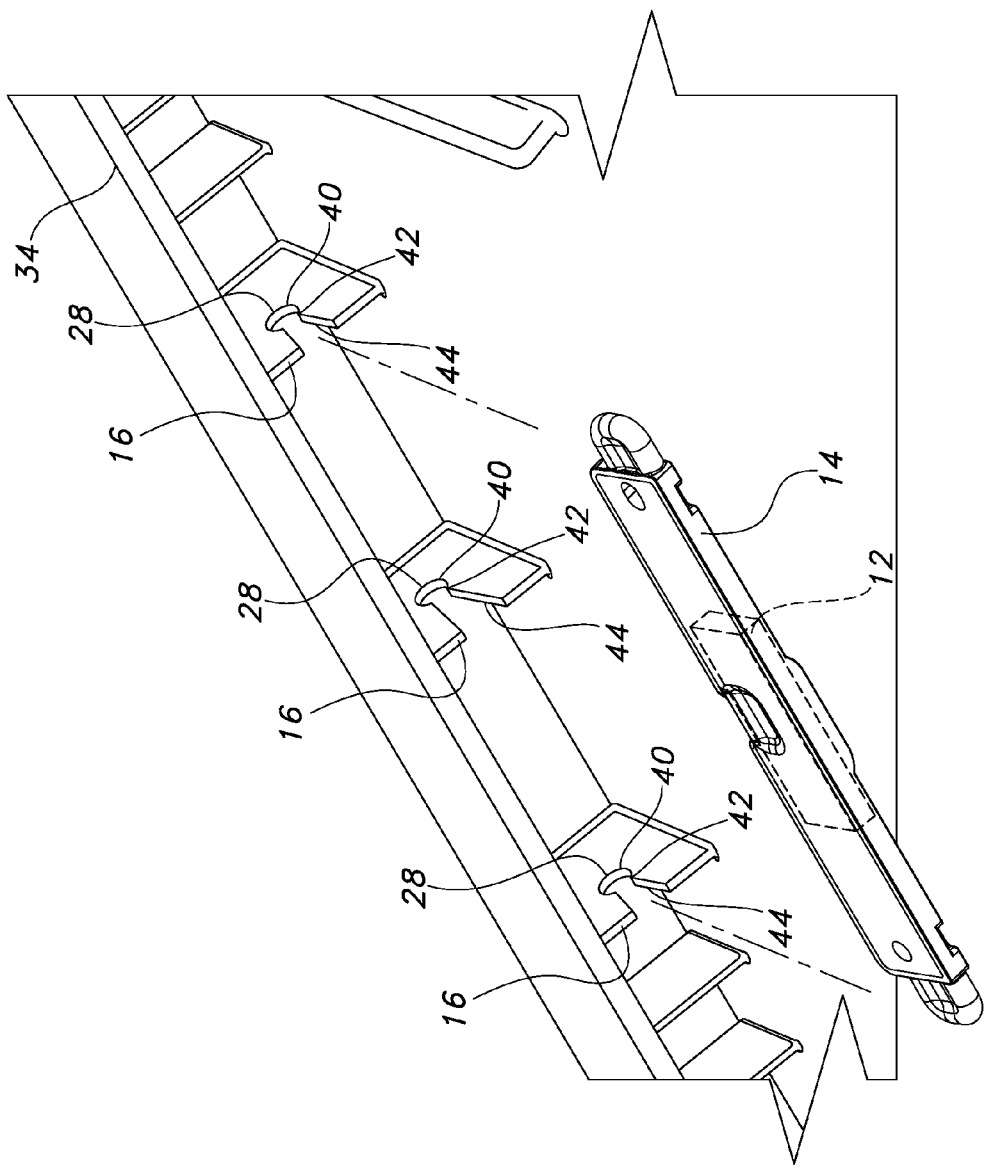
FIG. 2 is a perspective exploded view of a series of three slots formed in ribs on the cart.

The cart 10 includes a series of generally parallel ribs 16, each of which includes a bulbous opening or slot 28, enabling the case 14 to be snapped into multiple slots 28 and supported or grasped at multiple points along the case 14. For example, as shown in FIG. 2, the cart 10 includes a series of three ribs 16 that each include a bulbous slot 28. The number of ribs 16 defining a bulbous slot 28 may depend on the length of the RFID case 14 that will be retained and/or on the distance between the ribs 16. In the illustrated embodiment, the ribs 16 are positioned under a rim 34 that extends around the periphery of the upper end 32. The ribs 16 are positioned generally perpendicular to the rim 34, such that the ribs 16 connect the rim 34 to an outer surface 36 of the body 38 of the cart 10. After the RFID case 14 is snapped into the slots 28, the rim 34 may assist in protecting the RFID case 14 from becoming dislodged or being damaged during use of the cart 10.

The bulbous slot 28 in the ribs 16 can be keyhole-shaped, as shown in the illustrated embodiment, or any other shape that includes a bottom portion that is larger or wider than a central portion of the opening. In the illustrated embodiment, the bulbous slot 28 includes a head portion 40, a body portion 42 and a narrower neck portion 44 positioned between the head portion 40 and body portion 42, the neck portion 44 having a smaller width than that of the head portion 40 or body portion 42. While the bulbous slot 28 shown in the illustrated embodiment as having a rounded head portion 40, the head portion 40 can be formed in any shape that has a width that is larger than that of the neck portion 44.

II. Mold

Figure 3:
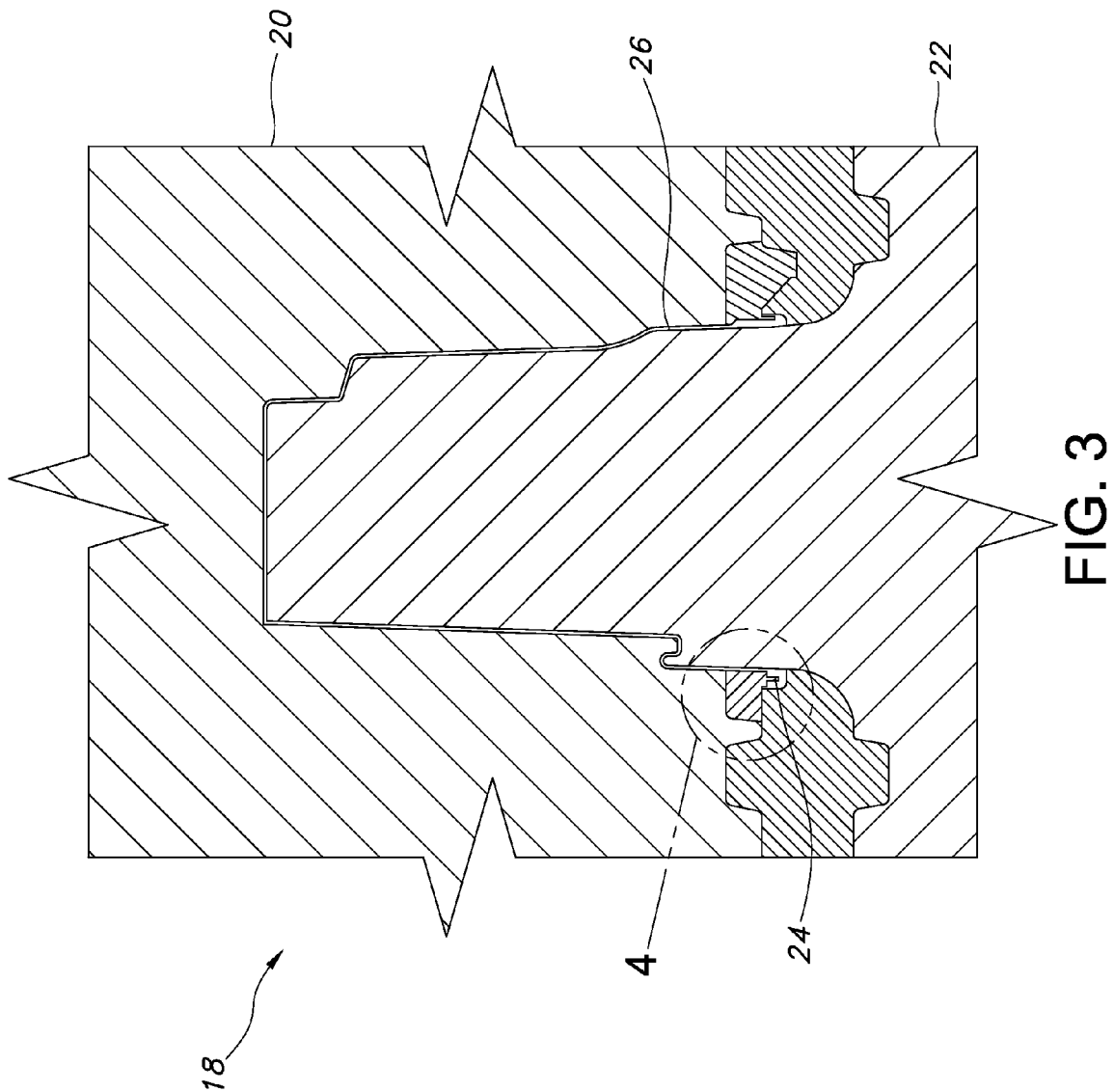
FIG. 3 is a sectional view of the mold adapted to form the cart.

The mold 18 that forms the cart 10 can be a conventional injection mold (FIG. 3). While the illustrated embodiment shows the upper mold half 20 directly above the lower mold half 22, the mold 18 can be arranged in an alternative orientation and can include additional mold portions.

Figure 4:
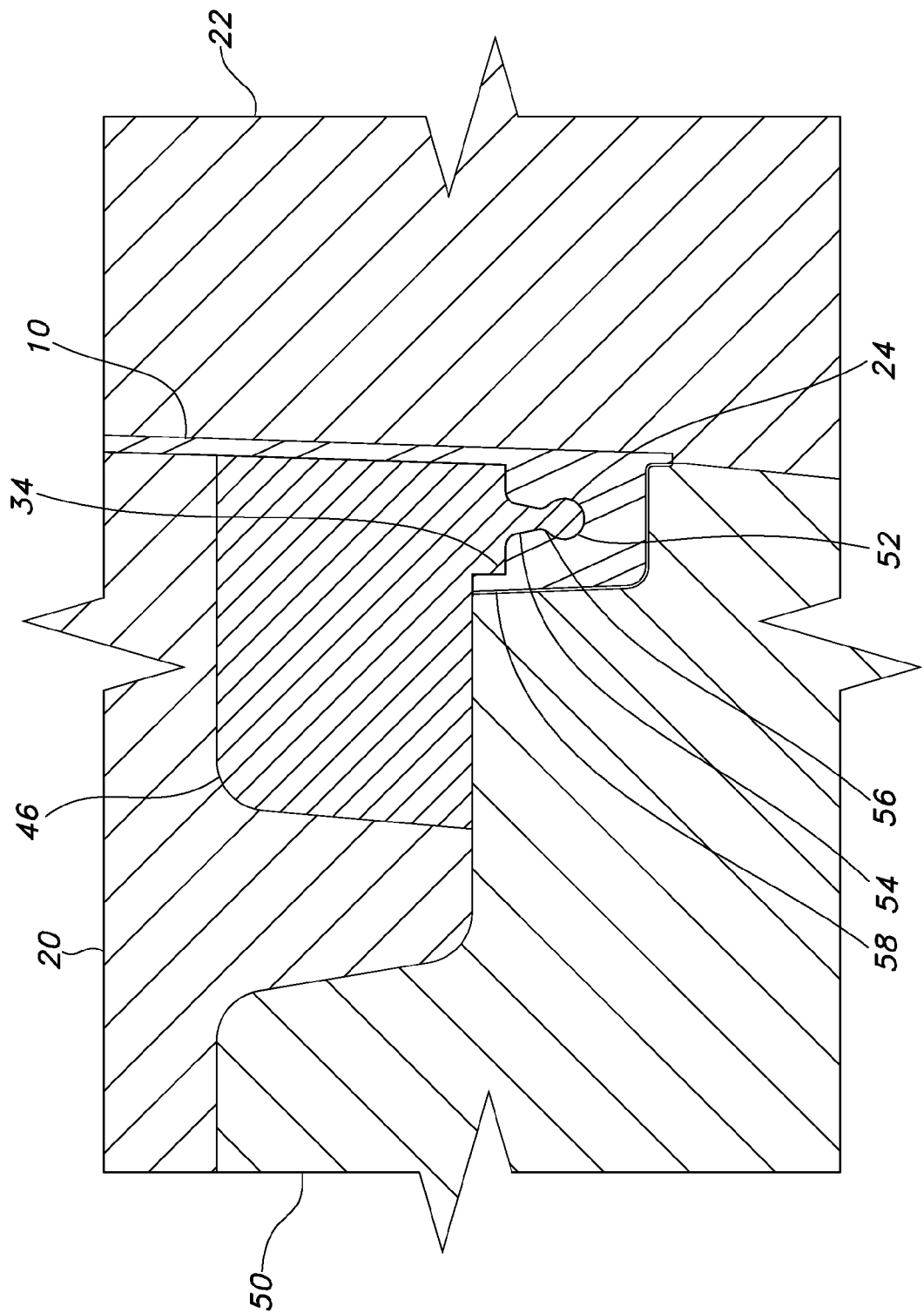
FIG. 4 is an enlarged sectional view of the mold within line 4 in FIG. 3.
Figure 5:
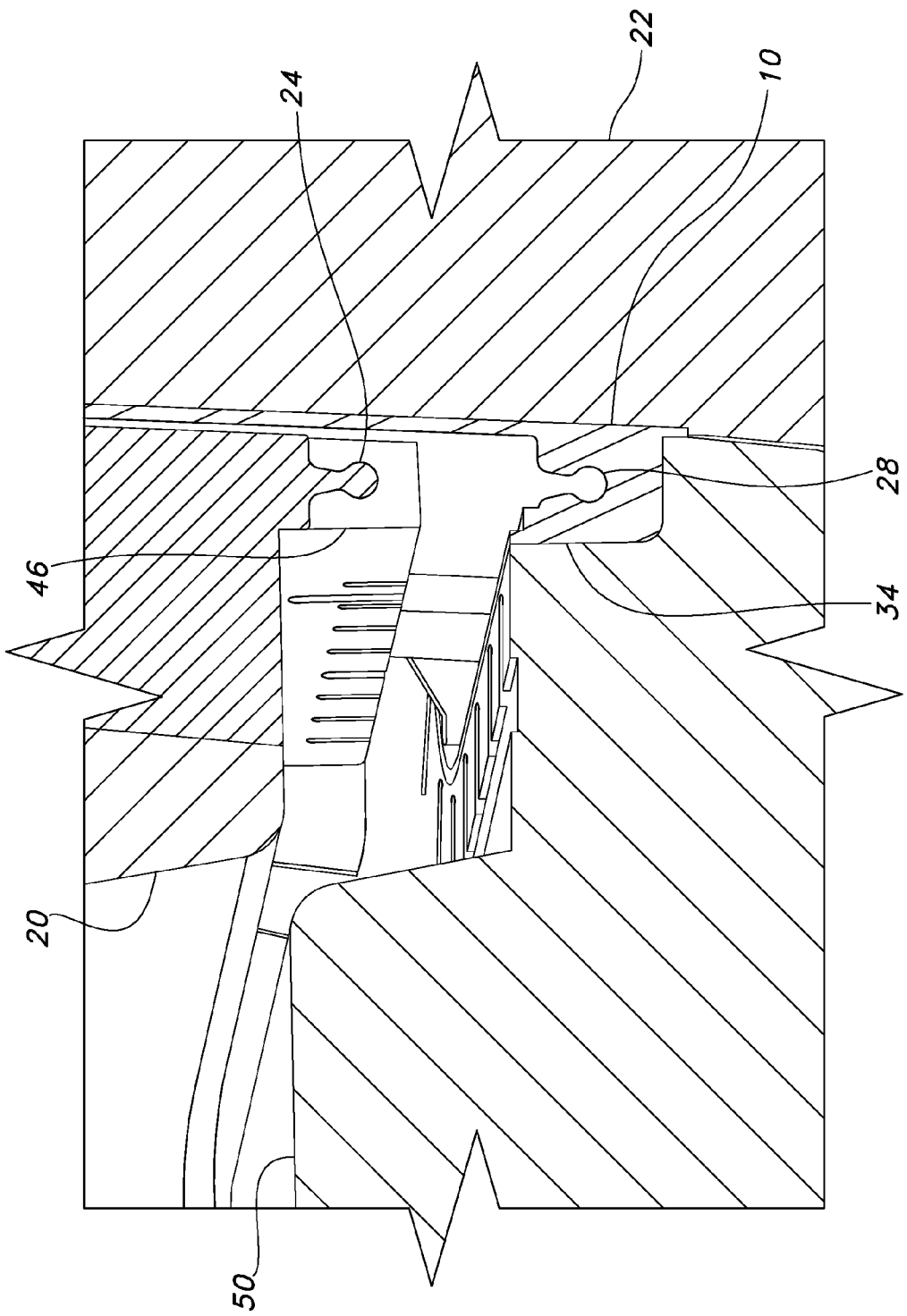
FIG. 5 is a sectional perspective view of the mold of the area shown in FIG. 4.

The upper mold half 20 of the mold 18 is a female mold half that forms a cavity that is adapted to form a majority of the outer surface 36 of the cart 10 (FIG. 3). As shown in FIGS. 4 and 5, the upper mold half 20 includes a portion 46 that includes the bulbous protrusion 24. The portion 46 is located on a lower portion of the upper mold half 20 and forms a portion of the mold cavity 26 that corresponds to the ribs 16, rim 34 and bulbous slot 28. Optionally, the portion 46 and the bulbous protrusion 24 can be formed integrally with the upper mold half 20. Alternatively, the portion 46 and bulbous protrusion 24 can be formed separately and fixed or secured to the upper mold half 20. The portion 46 and bulbous protrusion 24 can be positioned in any location on the upper mold half 20 where it is desirable to form the slot 28, and the slot 28 can be formed in any location where it is desirable to snap in and store the RFID case 14. Although the protrusion 24 is included on the upper mold half 20 in the illustrated embodiment, the protrusion 24 can alternatively be included on the lower mold half 20.

The bulbous protrusion 24 forms the bulbous slot 28 in the cart 10, such that the shape of the bulbous protrusion 24 generally corresponds to the bulbous slot 28. Like the slot 28, the protrusion 24 can be keyhole-shaped or any other shape that includes an end portion or terminal portion that is larger or wider than a central portion of the opening. In the illustrated embodiment, the bulbous protrusion 24 includes a head 52 (that generally corresponds to the head portion 40 of the slot 28), a body 54 (that generally corresponds to the body portion 42 of the slot 28) and a narrow neck 56 (that generally corresponds to the neck portion 44 of the slot 28).

The neck 56 of the protrusion 24 is undercut from, i.e. has a smaller width than, the head 52 and is positioned between the head 52 and body 54. While the bulbous protrusion 24 shown in the illustrated embodiment has a rounded head 52, the head 52 can be formed in any shape that has a width that is larger than that of the neck 56. The neck 56 typically is smaller or narrower than the head 52 so that the case 14 can rest in the head portion 40 of the slot 28 and be squeezed and retained by the material that defines the neck portion 44.

The undercut between the neck 56 and the head 52 can be approximately 0.020 inches on each side of the protrusion 24, such that the width of the neck 56 would be a total of approximately 0.040 inches smaller than greatest width of the head 52. Such a protrusion 24 would create a slot 28 having a neck portion 44 that is undercut from the head portion 40 approximately 0.020 inches on each side of the slot 28. This provides a balance between 1) a small enough undercut to enable the container to be removed from the mold without tearing the material and 2) a large enough undercut to retain the RFID case-securely.

Optionally, the case can be snapped into a series of aligned slots 28 in adjacent ribs 16 (FIG. 2). Multiple slots 28 can retain the case 14 at multiple locations along the length of the case 14, which can result in a lower minimum undercut in each of the slots 28. For example, a series of multiple slots 28 may require an undercut of only approximately 0.020 inches. Alternatively, if the case 14 is being retained by one slot 28, the single slot 28 may have an undercut of approximately 0.060 to 0.080 inches to ensure that the neck portion 44 of the slot 28 can securely retain the case 14. Such a slot 28 would require a protrusion 24 that also has an undercut of 0.060 to 0.080 inches. However, it is known in the art that the head 52 of such a protrusion 24 would likely strip or tear the undercut out of the slot 28. The undercut would be stripped because there would be inadequate clearance for the wide head portion of the protrusion to exit or slide through the neck portion.

A slot having an undercut of 0.060 to 0.080 inches could potentially be formed using a mold that includes a movable mold insert adapted to move in the mold cavity to create the slot 28 in the rib 16 (not shown). The movable mold insert could slide into and out of the rib 16 generally perpendicular to the rib 16, such that the head portion of the insert would not strip or tear the material in the neck portion of the slot on its way out of the slot. However, a movable mold insert is relatively expensive. Additionally, the movable insert is an additional moving piece in the mold that can potentially break and require service.

The lower mold half 22 is a male mold half that is adapted to fill the chamber 30 of the cart 10 to form a majority of the inner surface 48 of the cart 10 (FIGS. 1 and 3). The lower mold half 22 is adapted to mate with the upper mold half 20 to form the mold cavity 26.

Optionally, the mold 18 includes a stripper ring 50 that is adapted to assist in removing the cart 10 from the lower mold half 22. The stripper ring 50 is adapted to engage at least a portion of the cart 10, such that movement of the stripper ring 50 can push, pull, urge or otherwise force the cart 10 off of the lower mold half 22.

In the illustrated embodiment, the stripper ring 50 is also adapted to assist in forming the cart 10. As shown in FIG. 3, the stripper ring 50 engages both the upper and lower mold halves 20 and 22 and forms a portion of the mold cavity 26 that corresponds to the rim 34 and upper end 32 of the cart 10.

III. Method

In the current embodiment, the mold halves 20 and 22 are arranged with the upper mold half 20 being positioned above the lower mold half 22. At least one of the mold halves 20 and 22 is adapted to travel toward the other of the two mold halves 20, 22. In the illustrated embodiment, the upper mold half 20 travels downward toward the lower mold half 22 to close the mold 18 and form the mold cavity 26.

As shown in FIG. 3, the upper and lower mold halves 20 and 22 each engage and close around the stripper ring 50, which also forms a portion of the mold cavity 26. The portion 46 and the stripper ring 50 are arranged in the mold cavity to correspond to the rim 34, ribs 16 and slots 28 on the cart 10 (FIGS. 3-5). The protrusion 24 is oriented in a generally vertical position, with the head 52 facing generally downward in the direction of travel of the upper mold half 20.

The material is then injected into the mold cavity 26 to form the cart 10. The material envelopes or surrounds the bulbous protrusion 24, including the head 52, body 54 and neck 56. The material is then allowed to harden to form the cart 10.

The upper mold half 20, including the portion 46 and the bulbous protrusion 24, can then be separated or removed from the cart 10 and from the lower mold half 22. In the illustrated embodiment, the upper mold half is lifted directly upward, in a generally vertical direction (FIG. 5). Because the bulbous protrusion 24 is generally aligned with the direction of travel of the upper mold half 22, the protrusion 24 travels lengthwise out of the slot 28 created by the protrusion 24. Specifically, the head 52 of the protrusion 24 slides through the head portion 40, the neck portion 44 and the body portion 42 of the slot 28. Because the neck portion 44 of the opening is narrower than the head 52 of the protrusion 24, the neck portion 44 of the opening must stretch or widen or expand to accommodate the head 52 of the protrusion. If the neck portion 44 cannot stretch, the head 52 would strip or tear out the material that forms the neck portion 44, which would likely render the slot 28 unsuitable for retaining the case 14.

As shown in FIG. 4, the neck portion 44 of the slot 28 is able to widen to accommodate the head 52 of the protrusion 24 because the mold 18 has been designed to create a gap 58 between the stripper ring 50 of the mold 18 and the rim 34 of the cart 10. (Although the gap 58 may not actually be visible, the gap 58 has been expanded in FIG. 4 for purposes of illustration). The gap 58 is created in part because the material tends to shrink toward or tighten against the lower mold half 22. Because the protrusion 24 is oriented to be parallel with and generally alongside the lower mold half 22, the material of the rim 34 also tightens against the protrusion 24, which creates the gap 58 between the rim 34 and the stripper ring 50.

The gap 58 can also be created or widened when the upper and lower mold halves 20 and 22 are opened or separated. The initial removal of the portion 46 of the upper mold half 20, including the protrusion 24, from the cart 10 can release approximately 300 tons of pressure from the cart 10. This release of pressure enables the mold halves to move slightly with respect to one another creating a gap 58 because of the draft angle. Additionally, the material of the cart 10 contracts and tightens against the lower mold half 22 as the material freezes or hardens, which creates or widens the gap 58.

Once formed, the gap 58 provides enough clearance for the head 52 of the protrusion to press or otherwise force the rim 34 against the stripper ring 50 so that the head 52 can pass through the neck portion 44 of the slot 28. After the protrusion 24 has exited the slot 28, or while the protrusion 24 is exiting the opening, the rim 34 can return to its original position so that the keyhole shape of the slot 28 can be reestablished.

Figure 6:
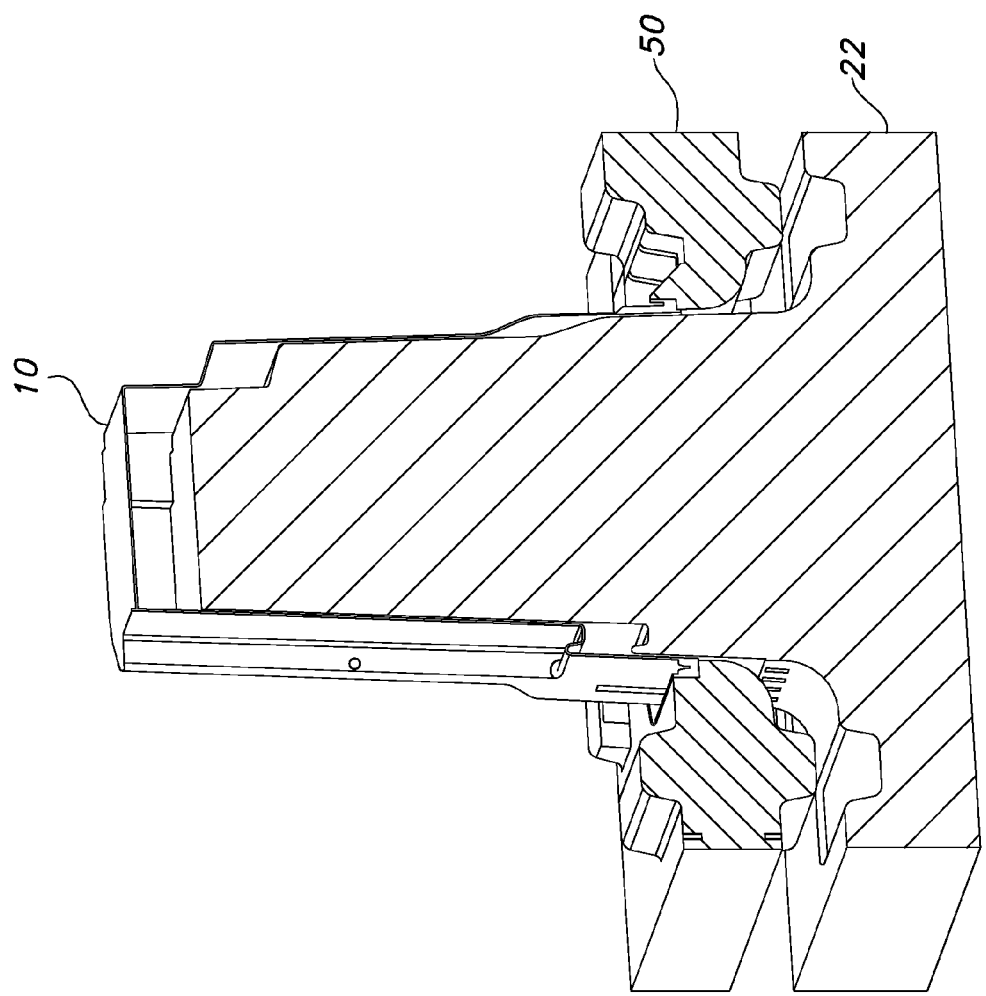
FIG. 6 is a sectional perspective view of the lower mold half and the stripper ring after the cart has been formed, with the stripper ring removing the cart from the lower mold half.
Figure 7:
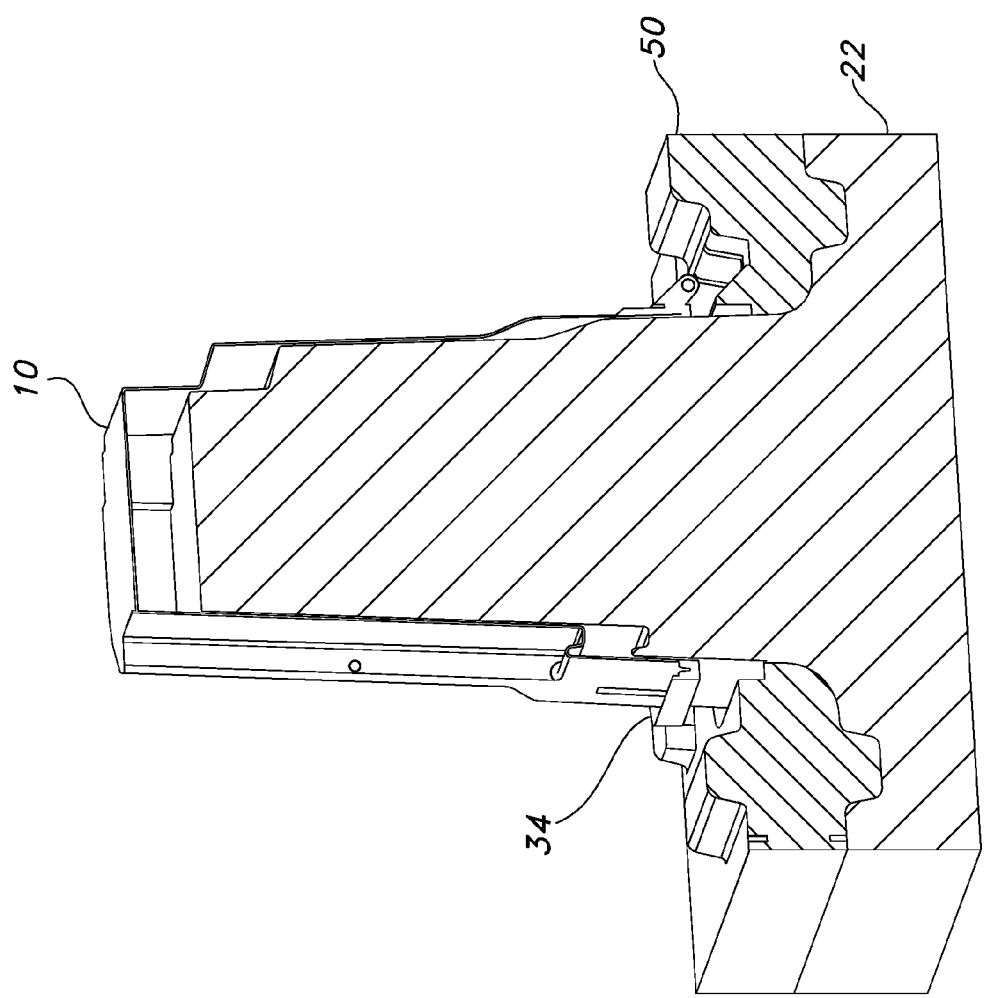
FIG. 7 is a sectional perspective view of the lower mold half and stripper ring after the cart has been lifted from the lower mold half, with the stripper ring shown in a starting position on the lower mold half.

As noted above, the material of the cart 10 may tighten against the lower mold half 22. As a result, the cart 10 may remain on the lower mold half 20 even after the upper mold half 20 is lifted from the cart 10. In order to assist in removing the cart 10 from the lower mold half 22, the stripper ring 50 can be adapted to engage a portion of the cart 10 and travel upward, which forces the cart 10 upward and dislodges the cart 10 from the lower mold half 22 (see FIG. 6). The stripper ring 50 may only lift the cart 10 a short distance off of the lower mold half 22, at which time the cart can be easily removed from or lifted off of the lower mold half 22. While the stripper ring 50 is shown in the illustrated embodiment as travelling directly upward, the stripper ring can be adapted to travel in any direction to assist in removing the cart 10 from the lower mold half 22.

An RFID case 14 can then be snapped into or otherwise inserted in the openings 28 in the ribs 16 of the cart 10 (FIGS. 1 and 2). As noted above, the resulting head portion 40 of the openings 28 can be sized to receive the RFID case 14. As the case 14 is inserted or snapped into the openings 28, the neck portion 44 of the slot 28 flexes outward to accommodate the width of the case 14. Once the case 14 is snapped into the openings 28, the material defining the neck portion 44 of the slot 28 will pinch and retain the case 14 in the slot 28.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method of forming a complete container, the method comprising:
   providing a mold having a first mold half and a second mold half movable relative one another along a single direction of travel, the first mold half including a bulbous protrusion generally aligned with the single direction of travel;
   closing the mold by moving the first and second mold halves relative one another along the single direction of travel to form a mold cavity corresponding to the shape of the complete container, wherein the bulbous protrusion is in the mold cavity;
   injecting a material into the mold cavity to form the complete container, wherein the material envelopes the bulbous protrusion to create a slot having an undercut portion;
   opening the mold by moving the first and second mold halves relative one another along the single direction of travel, the material staying on the second mold half, the opening step including withdrawing the bulbous protrusion from the slot along the single direction of travel; and
   removing the complete container from the second mold half.

2. The method of claim 1 further comprising allowing the material to harden in the mold to form the complete container, wherein the material tightens against the bulbous protrusion as it hardens and creates a gap in the mold.

3. The method of claim 2 wherein the bulbous protrusion and the slot each include a head portion, a narrow neck portion and a body portion, wherein withdrawing the bulbous protrusion from the slot includes withdrawing the head of the bulbous protrusion through the neck portion of the slot.

4. The method of claim 3 wherein the withdrawing step results in flexing the neck portion of the slot.

5. The method of claim 4 further comprising snapping an object into the slot in the complete container.

6. The method of claim 5 wherein the object is a case adapted to receive an RFID tag, wherein the method includes placing an RFID chip in the case and snapping the case into the slot.

7. The method of claim 6 wherein the mold is adapted to form a plurality of ribs on the complete container, wherein withdrawing the bulbous protrusion from the slot includes leaving the slot in at least one of the ribs.

8. The method of claim 1 wherein the undercut portion of the slot is in the range of approximately 0.020 to 0.080 inches.

9. The method of claim 8 wherein the undercut portion of the slot is approximately 0.020 inches.

10. A method of forming a complete waste container adapted to have an RFID tag attached thereto, the method comprising:
   providing a mold having an upper mold half and a lower mold half, the upper and lower mold halves movable relative one another along a single direction of travel, one of the upper and lower mold halves includes a bulbous protrusion generally aligned with the single direction of travel;

closing the upper and lower mold halves along the single direction of travel to form a mold cavity corresponding to the shape of the complete container and with the bulbous protrusion in the mold cavity;

injecting material into the mold cavity to form the complete container, wherein the material envelopes the protrusion to create a slot having a relatively narrow neck;

opening the upper and lower mold halves along the single direction of travel, the material remaining on the other of the upper and lower mold halves, the opening step including withdrawing the bulbous protrusion from the slot along the single direction of travel; and removing the complete container from the other mold half.

11. The method of claim 10 wherein the bulbous protrusion and the slot each include a head portion, a narrow neck portion and a body portion, wherein withdrawing the bulbous protrusion from the slot includes the neck portion of the slot flexing to accommodate the head of the bulbous protrusion.

12. The method of claim 11 wherein the mold is adapted to form a plurality of ribs on the complete container, wherein withdrawing the bulbous protrusion from the slot includes leaving the slot in at least one of the ribs.

13. The method of claim 10 wherein the neck portion of the slot is in the range of approximately 0.040 to 0.160 inches narrower than the width of the bulbous protrusion.

14. The method of claim 13 wherein the neck portion of the slot is approximately 0.040 inches narrower than the width of the bulbous protrusion.

15. The method of claim 10 further comprising snapping a case including an RFID tag into the slot.

16. The method of claim 3 wherein the slot is key-hole shaped.

17. The method of claim 11 wherein the slot is key-hole shaped.

* * * * *